US005625679A

United States Patent [19]
Gutzmer

[11] Patent Number: 5,625,679
[45] Date of Patent: Apr. 29, 1997

[54] TELEPHONE HANDSET INTERFACE FOR ALTERNATING VOICE-DATA (AVD) MODEM

[75] Inventor: Alan A. Gutzmer, Poway, Calif.

[73] Assignee: Gutzmer Enterprises, Ltd., San Diego, Calif.

[21] Appl. No.: 636,393

[22] Filed: Apr. 23, 1996

[51] Int. Cl.$^6$ .................................................. H04M 11/00
[52] U.S. Cl. .............................. 379/99; 379/442; 375/222
[58] Field of Search ........................... 379/93–100, 442, 379/443, 387, 397, 380, 399, 394, 398; 375/222

[56] References Cited

U.S. PATENT DOCUMENTS 5,455,859  10/1995  Gutzmer ................................. 379/93
5,473,676  12/1995  Frick et al. ............................. 379/99

Primary Examiner—Wing F. Chan
Attorney, Agent, or Firm—Brown, Martin, Haller & McClain

[57] ABSTRACT

An interface between an alternating voice-data (AVD) modem and a telephone that allows the modem to be connected to a PBX or office-type telephone system without using special software. The user speaks and listens through the telephone handset, which is disconnected from the telephone base and connected to the interface. The interface provides an impedance across the modem "Phone" connection. The impedance simulates the off-hook condition that would normally (i.e., when the modem is connected in the conventional manner to a non-PBX telephone) be provided by the non-PBX telephone and that, absent disabling the requirement by special software, the modem requires in order to properly switch between voice mode and data mode. The interface monitors the modem "Line" connection to detect whether the modem is in an off-hook state or an on-hook state. A compensation circuit minimizes attenuation of the wake-up tone by the impedance across the "Line" connection. When the interface detects that the modem is on-hook, the interface couples the handset to the telephone base. When the interface detects that the modem is off-hook, the relay circuit disconnects the handset and couples the modem "Line" connection to the telephone base.

14 Claims, 3 Drawing Sheets

TELEPHONE HANDSET INTERFACE FOR ALTERNATING VOICE-DATA (AVD) MODEM

BACKGROUND OF THE INVENTION

The present invention relates generally to interfaces or accessories for facilitating communications using a modem and, more specifically, to a device that allows an alternating voice-data modem (AVD) to be coupled to a digital or PBX-type telephone system via the handset jack of a telephone instrument.

A modem is a telecommunications device that is used for interfacing a computer, facsimile machine or similar data device with a telephone line to enable the data device to communicate with another like device over the telephone line. A modem typically has a data connection to the computer or other data device and a two-wire RJ-11 telephone connector for connecting the modem to the telephone line.

Practitioners in the art have developed modems known as alternating voice-data (AVD) modems that switch between a voice mode and a data mode. An AVD modem has a "Phone" jack for coupling it to a telephone instrument, as well as a "Line" jack for coupling it to the telephone line and a data connection for coupling it to the computer. The "Phone" and "Line" jacks are typically RJ-11 jacks. With the AVD modem in voice mode, a person can use the telephone instrument to conduct a conversation with another party. The AVD modem includes a number of relays, which are described in further detail below in the context of the present invention. In voice mode, the AVD modem relays loop the "TIP" and "RING" signals of the telephone instrument through the AVD modem and connect them directly to the telephone line "TIP" and "RING" signals. In other words, the AVD modem connects the "Phone" jack to the "Line" jack, thereby bypassing the internal data modulation/ demodulation circuitry of the AVD modem. If the person desires to send data from his computer to another party's computer, the person terminates the conversation and, using suitable data communication software, commands his computer to send data to the AVD modem. The sending AVD modem responds to the command received from the computer by automatically switching from voice mode to data mode and then generating a special "wake-up" tone that signals the other party's AVD modem to switch to data mode. In data mode, the AVD modem relays connect the data modulation/demodulation circuitry to the telephone line and disconnect the telephone instrument from the telephone line. Although the telephone instrument cannot be used during data communication because it is disconnected from the telephone line, the AVD modem nonetheless supplies the telephone instrument with the proper voltage to enable it to remain in an operational mode. When the data transmission is complete, the AVD modem automatically switches back to voice mode. An AVD modem thus allows a person to intersperse data communication with voice communication during a telephone call.

Another scheme that allows a person to communicate both data and voice during a telephone call is known as digital simultaneous voice-data (DSVD), also known as "voice-over-data." Voice-over-data modems allow voice and data to be transmitted simultaneously in a multiplexed manner rather than in the switched manner of an AVD modem. Voice-over-data modems are used by connecting a headset, a handset or a telephone instrument to them. Thus, although a voice-over-data modem, like an AVD modem, includes a connection for coupling it to a computer, a connection for coupling it to a telephone line, and another connection for providing voice communication, they handle the voice signal in completely different ways.

A modem cannot easily be connected to a digital or PBX-type telephone system. The problem is described U.S. Pat. No. 4,907,267, issued to Gutzmer, entitled "MODEM INTERFACE DEVICE." In a PBX telephone system, multiple lines are serviced by a central controller. It is difficult to achieve dedicated line service for a modem because the telephone line to which a particular telephone instrument is connected carries digital line selection information and power in addition to the audio frequency communication signal of the handset. To solve this problem, the above-referenced U.S. patent describes a solution in which a modem is connected to the telephone system via the handset jack of the telephone instrument base unit. The patent describes an interface device that allows a user to switch between voice and data communication. To use the interface device, both the modem and the handset that was unplugged from the telephone instrument are plugged into the device. The device is then plugged into the handset jack of the telephone instrument base. The device has a switch that allows the user to selectively connect either the handset or the modem to the handset jack. The interface device converts the two-wire modem connection to the four-wire handset connection using a transformer. The transformer also provides impedance matching.

An interface device for connecting a voice-over-data modem to a digital or PBX-type telephone system is described in U.S. Pat. No. 5,455,859, also issued to Gutzmer, entitled "TELEPHONE HANDSET INTERFACE FOR DEVICE HAVING AUDIO INPUT." The problem solved by that interface device is to provide proper DC bias voltages to the headset or handset microphone while routing the audio frequency voice signals from the microphone and speaker to the telephone line. An AVD modem does not exhibit this problem because it is connected to a complete telephone instrument rather than to a headset or handset by itself. Nevertheless, there are other problems that must be solved in order to provide an interface device for connecting an AVD modem to a digital or PBX-type telephone system.

An AVD modem typically automatically switches between data mode and voice mode in the manner described above only if the telephone instrument remains off-hook, although certain AVD modems allow themselves to be set up via software to override this requirement. This requirement is not a problem when an AVD modem is used in the conventional manner with a standard analog (non-PBX) telephone. The user simply does not return the handset to the cradle when initiating a data transmission. The requirement that the telephone instrument remain off-hook presents problems, however, to interfacing the AVD modem to a digital or PBX-type telephone system.

A modem interface device for connecting an AVD modem to a digital or PBX-type telephone system is known as INSIDE LINE™ and is produced by Radish Communications Systems, Inc. The INSIDE LINE™ interface device utilizes the software set-up feature of certain AVD modems noted above. The INSIDE LINE™ interface device thus operates only in conjunction with special software executing on the computer. The software generates a command, in response to which the AVD modem disables its circuitry for sensing whether the telephone instrument is on-hook or off-hook.

It would be desirable to provide an interface device for connecting an AVD modem to a digital or PBX-type telephone system that does not require special software executing on the computer. These problems and deficiencies are clearly felt in the art and are solved by the present invention in the manner described below.

SUMMARY OF THE INVENTION

The present invention comprises an interface between an AVD modem and a telephone that allows the AVD modem to be connected to a PBX or office-type telephone system. The interface includes a telephone base output connection for coupling the interface to the microphone input of a telephone instrument base unit, a telephone base input connection for coupling the interface to the speaker output of a telephone instrument base unit, an audio input for receiving audio signals from a microphone such as that in a telephone handset, an audio output for providing audio signals to a speaker such as that in a telephone handset, an AVD modem "Phone" connection for coupling the interface to a "Phone" connector of an AVD modem, and an AVD modem "Line" connection for coupling the interface to a "Line" connector of an AVD modem. The interface also includes an off-hook circuit and a switching circuit.

The off-hook circuit provides an impedance across the "TIP" and "RING" lines of the AVD modem "Phone" connection. The impedance simulates the off-hook condition that would normally (i.e., when the AVD modem is connected in the conventional manner to a non-PBX telephone) be provided by the telephone and that the AVD modem requires in order to properly switch between voice mode and data mode.

The off-hook circuit also monitors the AVD modem "Line" connection to detect whether the AVD modem is in an off-hook state or an on-hook state. When the off-hook circuit detects that the AVD modem is on-hook, i.e., it is not in use transmitting data, the off-hook circuit causes the switching circuit to couple the audio input to the telephone base output connection and the audio output connection to the telephone base input connection. Using a handset, headset or other suitable speaker and microphone combination coupled to the microphone input and speaker output, a user can then speak to another party with whom a telephone connection has been established. When the off-hook circuit detects that the AVD modem is off-hook, i.e., it is ready to transmit data, the off-hook circuit causes the switching circuit to uncouple the audio input and output from the telephone base connections and couple the AVD modem "Line" connection to the telephone base connections. A two-to-four-wire converter, which is a well-known type of circuit, is preferably included to couple the telephone base input and output connections to the AVD modem "Line" connection.

The invention may also include means for preventing the impedance across the AVD modem "Phone" connection from undesirably loading the AVD modem "Line" connection when the AVD modem is on-hook. Absent this circuit, such loading would occur because the AVD modem connects its "Phone" connector directly to its "Line" connector when it is on-hook. The presence of the impedance may undesirably attenuate signals on the "Line" connector, such as the wake-up tone that indicates another party's AVD modem is requesting the user's AVD modem switch to data mode.

The present invention does not require any special software because, rather than disable the on-hook/off-hook detection circuitry of the AVD modem, the present invention provides the off-hook condition that this circuitry normally requires.

It should be noted that the term "connection," as used herein, refers to the terminus of a signal at the novel interface described herein, and is not limited to a connector arrangement, such as a jack or plug, or limited to a specific grouping of signals at a jack, plug or other connector. Furthermore, the term "AVD modem," as used herein, includes not only what is known in the prior art by that name but also any equivalent device that may be known by a different name.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
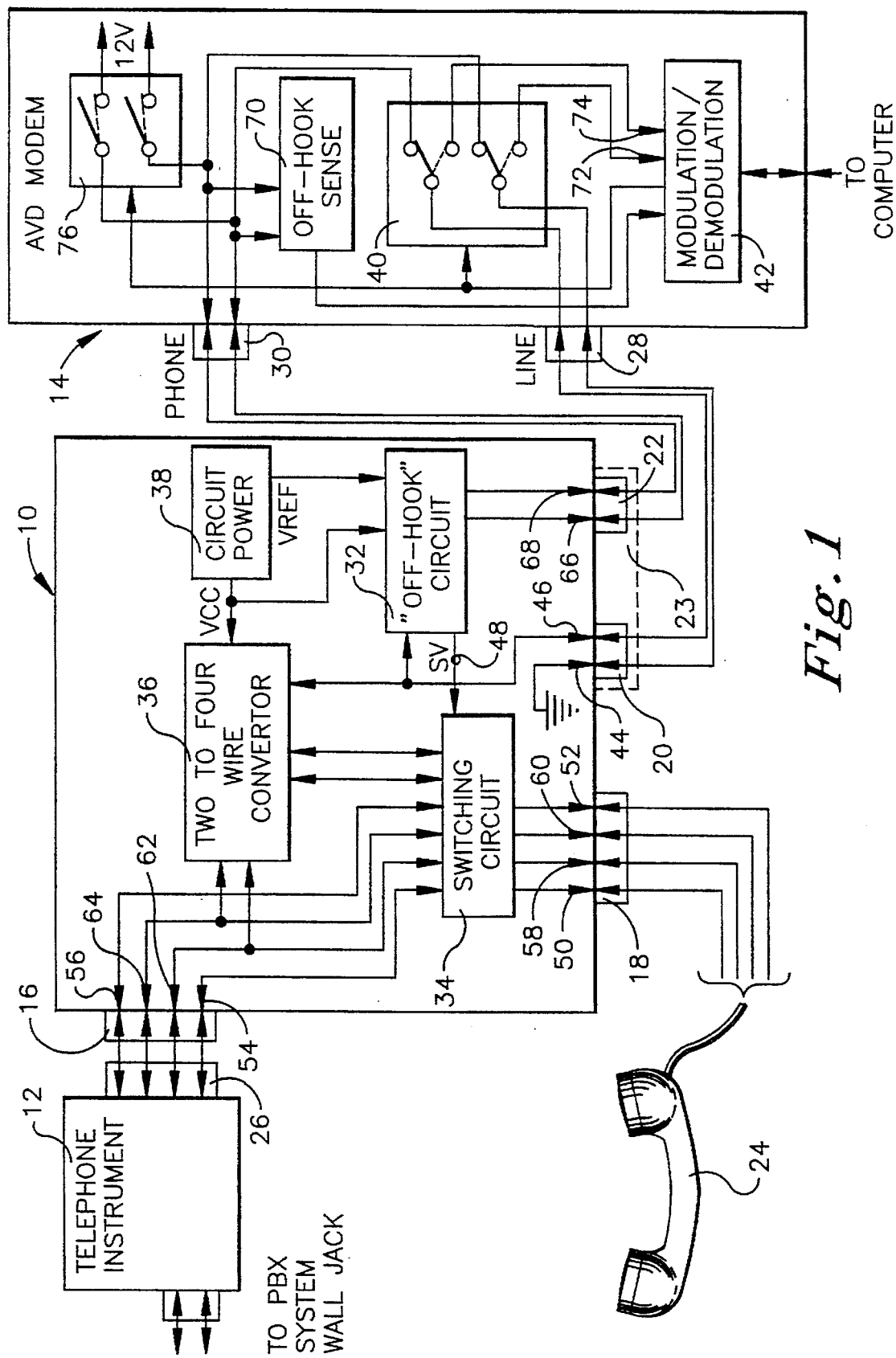
FIG. 1 is a block diagram of the interface device circuitry of the present invention, showing it connected between the telephone instrument and the AVD modem.

As illustrated in FIG. 1, the interface 10 of the present invention is an electronic device that may be used to connect a telephone instrument 12 to an AVD modem 14. AVD modem 14 may be any type of commercially available AVD modem, such as those utilizing the VOICE VIEW® technology of Radish Communications Systems, Inc. Interface 10 has a telephone base connection 16, an audio connection 18, a "Line" connection 20 and a "Phone" connection 22. "Line" connection 20 and "Phone" connection 22 are shown schematically in FIG. 1 as individual connections, but they are preferably integrated in a single physical connector 23. Telephone instrument 12 is connected to a wall jack of a digital or PBX-type telephone system (not shown) in the conventional manner.

To use interface 10, a user disconnects the handset 24 from the handset connection 26 of telephone instrument 12. The user then connects telephone base connection 16 of interface 10 to handset connection 26 of telephone instrument 12, and connects handset 24 to audio connection 18. The user also connects "Line" connection 20 of interface 10 to the "Line" connection 28 of AVD modem 14, and connects "Phone" connection 22 of interface 10 to the "Phone" connection 30 of AVD modem 14. Connections 16, 18, 20, 22, 26, 28 and 30 may each include a RJ-11 jack and a mating RJ-11 plug, which are the type of connectors commonly included in telephony equipment, but any suitable connectors may be used.

Interface 10 includes an "off-hook" circuit 32, a switching circuit 34, a two-to-four-wire converter 36, and a power circuit 38. Power circuit 38 generates a supply voltage (VCC) that it provides to off-hook circuit 32 and two-to-four-wire converter 36 and a reference voltage (VREF) that it provides to off-hook circuit 32.

When AVD modem 14 is in voice mode, a relay 40 in AVD modem 14 couples "Line" connection 28 to "Phone" connection 30, bypassing the modulation/demodulation circuitry 42 of modem 14. Coupling connections 28 and 30 in this manner would allow a person to carry on a conversation using a telephone if one were connected in the conventional manner to "Phone" connection 30 and if "Line" connection 28 were connected in the conventional manner to a wall jack of an analog (non-PBX) telephone system. With AVD modem connected in the novel manner shown in FIG. 1, however, interface 10 allows a person to carry on a conversation using handset 24. In voice mode, modulation/demodulation circuitry 42 is in an on-hook state, i.e., it is not in use modulating or demodulating data. As described in further detail below, modulation/demodulation circuitry 42 provides an indication of the on-hook condition at "Line" connection 28.

In interface 10, off-hook circuit 32 detects whether the signal received at "Line" connection 28 indicates that AVD modem 14 (specifically, modulation/demodulation circuitry 42) is in an on-hook state or an off-hook state. The signal received at one terminal 44 of "Line" connection 20 is grounded, and the signal received at the other terminal 46 is provided to off-hook circuit 32 as well as two-to-four-wire converter 36. Off-hook circuit 32 produces a switching signal 48 (SV) that is preferably equal to zero volts when AVD modem 14 is in an on-hook state and equal to the supply voltage (VCC) when AVD modem 14 is in an off-hook state. When AVD modem 14 is in an on-hook state, in response to switching signal 48 switching circuit 34 connects the handset microphone signals received at terminals 50 and 52 of audio connection 18 to the corresponding terminals 54 and 56 of telephone base connection 16, and connects the handset speaker signals received at terminals 58 and 60 of audio connection 18 to the corresponding terminals 62 and 64 of telephone base connection 16.

An important feature of the invention, as described with respect to the illustrated embodiment, is that off-hook circuit 32 provides an off-hook indication at "Phone" connection 22. AVD modem 14 requires the presence of this off-hook indication at its "Phone" connection 30 in order to automatically switch from voice mode to data mode, unless the requirement is disabled via a software command. Off-hook circuit 32 provides this off-hook indication by connecting an impedance across the signals at terminals 66 and 68 of "Phone" connector 22 in a manner described in further detail below with respect to FIGS. 2A–B. AVD modem 14 has a sensing means 70 for detecting the off-hook condition at its "Phone" connection 30.

Modulation/demodulation circuitry 42 of AVD modem 14 responds to a wake-up tone that it receives from another AVD modem (not shown) to which it is connected via the telephone network (not shown). Modulation/demodulation circuitry 42 also responds to a ring voltage that it receives via the telephone network. Because the requirement that sensing means 70 be presented with an off-hook condition at "Phone" connection 30 is fulfilled, when AVD modem 14 receives a wake-up tone or ring voltage it (specifically, modulation/demodulation circuitry 42) switches from the on-hook state to the off-hook state. In response to AVD modem 14 switching to the off-hook state, relay 40 connects modulation/demodulation circuitry 42 to "Line" connector 28 and disconnects "Line" connector 28 from "Phone" connector 30. Modulation/demodulation circuitry 42 connects an impedance across the signals 72 and 74 to indicate that it is in the off-hook state. Also in response to AVD modem 14 switching to the off-hook state, another relay 76 connects a source of 12 volts across the signals at "Phone" connection 30. The purpose of this voltage is to provide operating power to a telephone instrument when AVD modem 14 is connected to one in the conventional manner. Because interface 10 includes its own power circuit 38 interface 10 does not utilize the voltage provided by AVD modem 14. Nevertheless, interface 10 includes circuitry described below with respect to FIGS. 2A–B that prevents this voltage from affecting proper switching of off-hook circuit 32.

Off-hook circuit 32 in interface 10 detects the off-hook state at "Line" connection 20 and, in response, asserts switching signal 48 (SV). In response to assertion of switching signal 48, switching circuit 34 disconnects the handset microphone signals received at terminals 50 and 52 of audio connection 18 from corresponding terminals 54 and 56 of telephone base connection 16, and disconnects the handset speaker signals received at terminals 58 and 60 of audio connection 18 from the corresponding terminals 62 and 64 of telephone base connection 16. Also in response to assertion of switching signal 48, switching circuit 34 connects the signals received at "Line" connection 20 to telephone base connection 16 via two-to-four-wire converter 36. Also via two-to-four-wire converter 36, signals received at "Line" connection 20 are connected to terminals 54 and 56 of telephone base connection 16, and signals received at terminals 62 and 64 of telephone base connection 16 are connected to "Line" connection 20.

After AVD modem 14 switches to the off-hook state, the computer (not shown) to which AVD modem 14 is connected can communicate data with a remote modem (not shown) in the conventional manner. When data mode communication is complete, AVD modem 14 automatically switches back to the on-hook state, thereby allowing voice mode communication to resume in the manner described above.

It should be recognized that AVD modem 14 can initiate data mode communication in addition to switching to data mode communication in response to a wake-up tone or ring voltage. Suitable software is commercially available that allows the computer to initiate data communication via AVD modem 14. When data communication is complete, AVD modem 14 switches back to voice mode communication.

Figure 2A:
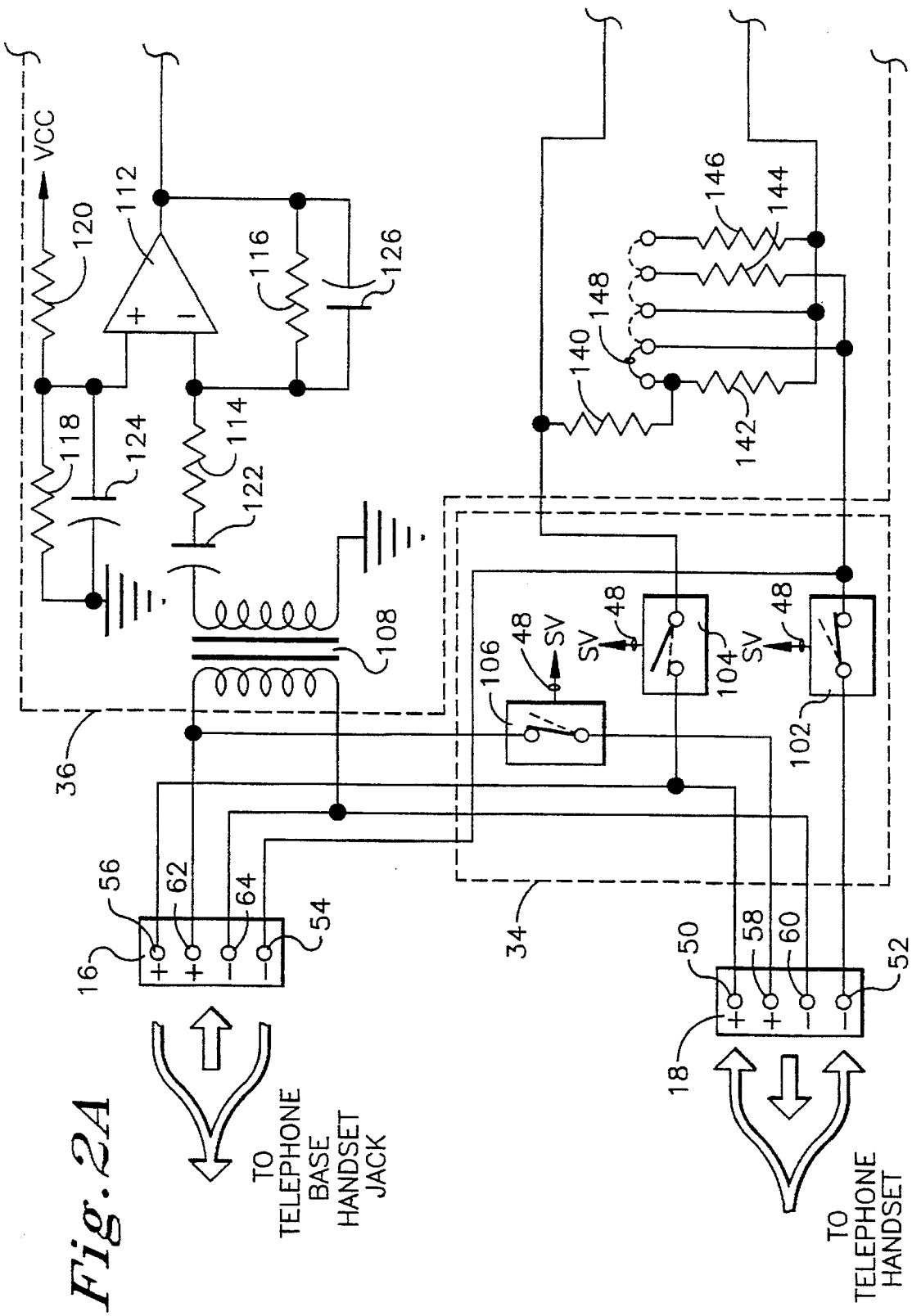
FIGS. 2A–B is a schematic diagram of the circuitry of the interface device of the present invention.
Figure 2B:
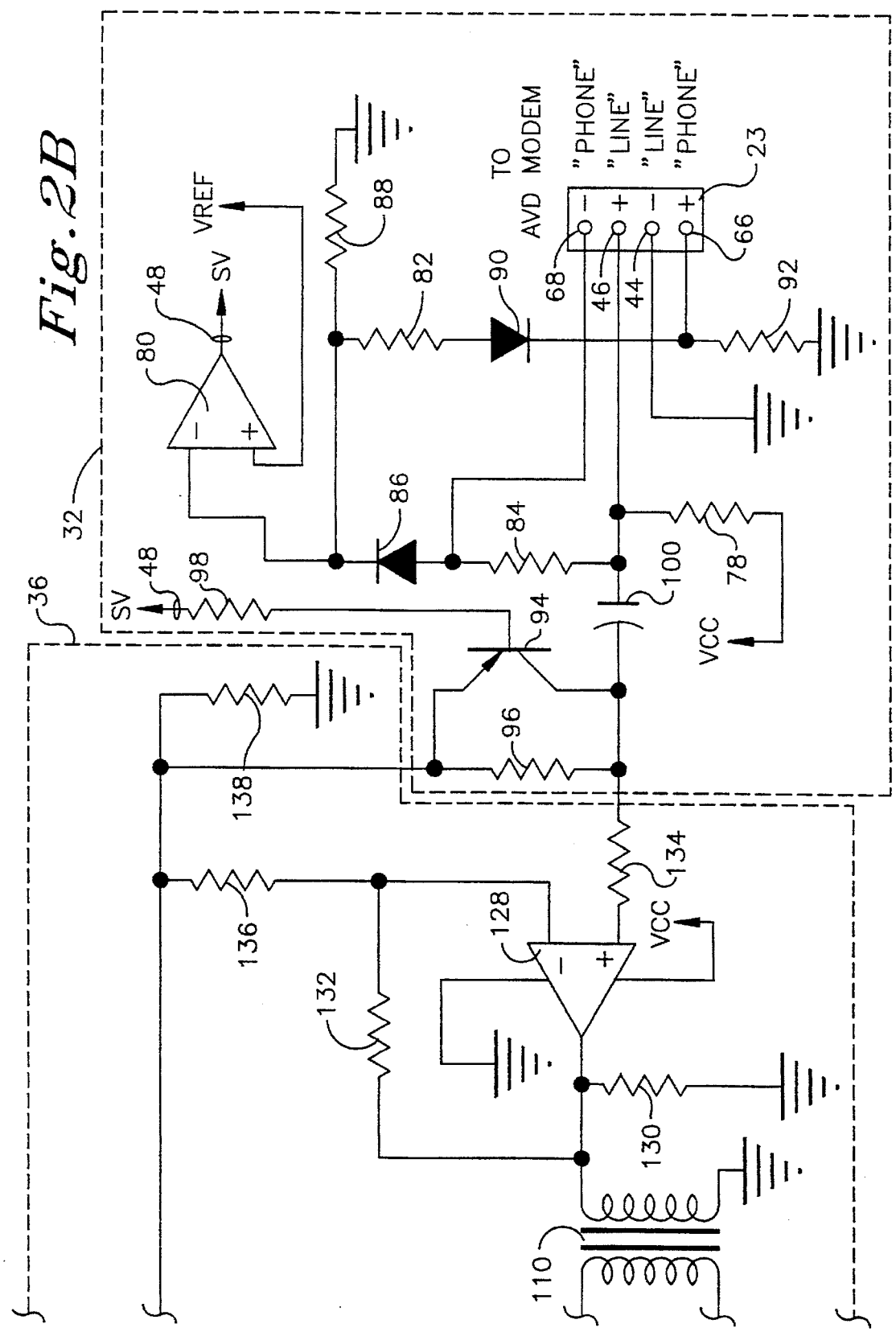

Interface 10 is illustrated in further detail in FIGS. 2A–B. The supply voltage (VCC) is preferably about 8 volts, and the reference voltage (VREF) is preferably 7.5 volts. Off-hook circuit 32 includes a resistor 78 that provides a DC voltage at terminal 46 of the "Line" connection. Resistor 78 also provides some impedance isolation between the supply voltage (VCC) and the "Line" connection. An operational amplifier (op-amp) 80 is configured to function as a comparator. When the "Line" connection indicates an on-hook condition, the op-amp 80 drives switching signal 48 (SV) to zero volts. When the "Line" connection indicates an off-hook condition, op-amp 80 drives switching signal 48 (SV) to the supply voltage (VCC). A load resistor 82 provides the proper impedance across terminals 66 and 68 of the "Phone" connection to create the off-hook condition that AVD modem 14 requires to enable automatic switching between voice mode and data mode.

In the on-hook state, AVD modem 14 connects terminal 66 to terminal 44 and connects terminal 46 to terminal 68. A first current flows through resistors 78 and 84, through a diode 86 and a resistor 88 to ground. A second current flows out of terminal 46, through AVD modem 14, and back into terminal 68, where it joins the first current at diode 86. The two current establish a voltage at the inverting input of op-amp 80 that is greater than the reference voltage (VREF) at the non-inverting input of op-amp 80. Therefore, op-amp 80 drives switching signal 48 to zero volts.

As noted above with respect to FIG. 1, in the off-hook state, AVD modem 14 presents an impedance across terminals 44 and 46 of the "Line" connection and places 12 volts across terminals 66 and 68 of the "Phone" connection. The impedance reduces the first current described above. The lower current establishes a voltage at the inverting input of op-amp 80 that is less than the reference voltage (VREF) at the non-inverting input of op-amp 80. Therefore, op-amp 80 drives switching signal 48 to the supply voltage (VCC). A diode 90 blocks any current flowing into terminal 66 resulting from the 12 volt signal across terminals 66 and 68. Such current could undesirably increase the voltage at the inverting input of op-amp 80 and prevent proper switching. Similarly, diode 86 blocks any current flowing out of terminal 68 resulting from the 12 volt signal across terminals 66 and 68. Such current could undesirably decrease the voltage at the inverting input of op-amp 80 and prevent proper switching. Diodes 86 and 90 thus ensure that the current in the "Phone" connection flows in a loop into terminal 68, through diodes 86 and 90 and out of terminal 66. Because load resistor 82 is in this loop, AVD modem 14 detects an off-hook condition at the "Phone" connection and is able to switch properly between voice mode and data mode.

It will be appreciated that interface 10 can be connected to a non-AVD modem in place of AVD modem 14. Resistor 84 pulls the non-inverting input of op-amp 80 up to a positive voltage when a non-AVD modem, is connected to terminals 44 and 46 of the "Line" connection. When a non-AVD modem is connected to terminals 44 and 46 of the "Line" connection, nothing is connected to terminals 66 and 68 of the "Phone" connection. A resistor 92 and resistor 84 together form a voltage divider.

Off-hook circuit 32 also includes a circuit that compensates for the impedance added by load resistor 82. In the on-hook state, AVD modem 14 awaits a wake-up tone or a ring signal. Certain telephone instruments 12 may attenuate signals to a greater extent than others. The combined attenuation caused by telephone instrument 12 and load resistor 82 may be sufficiently great to prevent AVD modem 14 from detecting a received wake-up tone. The compensation circuit includes a transistor 94 that shorts a resistor 96 when it receives a switching signal 48 of zero volts through a resistor 98. Shorting resistor 96 compensates for the presence of resistor 82. Because resistor 96 is bypassed, the wake-up tone received from two-to-four wire converter 36 is coupled directly to terminals 44 and 46 of the "Line" connection via a capacitor 100. In response to the wake-up tone, AVD modem 14 switches to the off-hook state and, in response to detection of the off-hook state, op-amp 80 drives switching signal 48 to the supply voltage (VCC). Transistor 94 turns off in response to the supply voltage applied to its base, thereby resistor 96 to resume its primary function as a nulling resistor in two-to-four-wire converter 36.

Switching circuit 34 includes three relays 102, 104 and 106, each controlled by switching signal 48 (VREF). In voice mode operation, i.e., when switching signal 48 (VREF) is zero volts, relays 102 and 106 are closed, and relay 104 is open. Relay 102 couples voice signals received from handset 24 (FIG. 1) via terminals 50 and 52 of audio connection 18 to terminals 54 and 56 of telephone base connection 16. Relay 104 prevents these signals from reaching two-to-four-wire converter 36. Relay 106 couples voice signals received from terminals 62 and 64 of telephone base connection 16 to handset 24 (FIG. 1) via terminals 58 and 60 of audio connection 18.

In data mode operation, i.e., when switching signal 48 (VREF) is driven to the supply voltage (VCC), relays 102 and 106 are open. Relays 102 and 106 disconnect handset 24 (FIG. 1), thereby preventing voice signals from interfering with data communication. Relay 104 is closed to couple signals received from terminals 44 and 46 of the "Line" connection to terminals 54 and 56 of telephone base connection 18 via two-to-four-wire converter 36. Similarly, signals received from terminals 62 and 64 of telephone base connection 16 are coupled to terminals 44 and 46 of the "Line" connection via two-to-four-wire converter 36.

Two-to-four wire converter 36, which is a type of circuit sometimes referred to in the art as a "hybrid circuit," includes two transformers 108 and 110 and two amplifier circuits. The first amplifier circuit receives data signals from terminals 62 and 64 of telephone base connection. The first amplifier circuit includes an op-amp 112, resistors 114, 116, 118 and 120. It further includes capacitors 122, 124 and 126. Resistor 114 in series with capacitor 122 couple the signals received via transformer 108 to the inverting input of op-amp 112. Resistor 118 and 124 are in parallel and connected between the non-inverting input of op-amp 112 and ground. Resistors 116 and 126 are in parallel and are connected between the inverting input of op-amp 112 and the output of op-amp 112. The second amplifier circuit receives data signals from terminals 44 and 46 of the "Line" connection and also prevents feedback of the sidetone signal received at terminals 62 and 64 of telephone base connection 16. The second amplifier circuit includes an op-amp 128, a resistor 130 connected between the output of op-amp 128 and ground, a resistor 132, connected between the inverting input of op-amp 128 and the output of op-amp 128, and a resistor 134 connected between the non-inverting input of op-amp 128 and the output of off-hook circuit 32. A resistor 136 couples the output of the first amplifier circuit to the inverting input of op-amp 128 to control sidetone feedback. A resistor 138 provides a DC path to ground.

Two-to-four-wire converter 36 also preferably includes a resistor network between transformer 110 and switching circuit 34 to selectably optimize the signal level for the attenuation characteristics of telephone instrument 12. The network includes resistors 140, 142, 144 and 146 and a jumper 148. The user may select a resistance by placing the jumper at one of several positions between the resistors.

As described above, interface 10 allows a person to carry on a conversation with a remote party using handset 24 when AVD modem 14 is in voice mode by coupling handset 24 to the telephone instrument base. If the AVD modem receives a wake-up tone from the remote party's AVD modem, it automatically switches to data mode in response. This automatic switching upon receipt of the wake-up tone or a ring signal is enabled because interface 10 presents an impedance across the "Phone" connection of AVD modem 14 to indicate an off-hook state. Interface 10 also includes a compensation circuit that minimizes attenuation of the wake-up tone by this impedance. When AVD modem 14 switches to data mode, interface 10, in response, disconnects handset 14 and couples the "Line" connection of AVD modem 14 to the telephone instrument base. AVD modem 14 may send data to and receive data from the remote party's computer. When data transmissions are complete, AVD modem 14 automatically returns to voice mode to allow the parties to resume their conversation.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An interface for connecting an AVD modem having an AVD modem "Phone" connection and an AVD modem "Line" connection to a telephone instrument, the AVD modem having modulation/demodulation circuitry and having relay means for connecting the AVD modem "Phone" connection to the AVD modem "Line" connection when the modulation/demodulation circuitry is in an on-hook state and for connecting the modulation/demodulation circuitry to the AVD modem "Line" connection when the modulation/demodulation circuitry is in an off-hook state, the interface comprising:

a telephone base input connection for receiving signals from said telephone instrument;

a telephone base output connection for providing signals to said telephone instrument;

an audio input connection for receiving signals from a microphone;

an audio output connection for providing signals to a speaker;

an interface "Phone" connection connectable to said AVD modem "Phone" connection;

an interface "Line" connection connectable to said AVD modem "Line" connection;

an off-hook circuit for detecting whether signals received at said AVD modem "Line" connection indicate an off-hook state or an on-hook state and for coupling a load resistor to said interface "Phone" connection;

a two-to-four-wire converter circuit between said AVD modem "Line" connection and said telephone base input and output connections;

a switching circuit for coupling signals received at said audio input connection to said telephone base output connection when said signals received at said interface "Line" connection indicate an on-hook state, for coupling signals received at said telephone base input connection to said audio output connection when said signals received at said interface "Line" connection indicate an on-hook state, for coupling signals received at said interface "Line" connection to said telephone base output connection when said signals received at said interface "Line" connection indicate an off-hook state, and for coupling signals received at said telephone base input connection to said interface "Line" connection when said signals received at said interface "Line" connection indicate an off-hook state.

2. The interface recited in claim 1, wherein said off-hook circuit comprises:

a loop circuit having a first node at a terminal of said interface "Phone" connection, a second node at another terminal of said interface "Phone" connection, and a third node coupled to a terminal of said interface "Line" connection, said loop circuit including said load resistor;

a comparing circuit having an input coupled to said loop circuit for detecting whether an input voltage exceeds a predetermined threshold, said input voltage changing in response to connection of an impedance between two terminals of said interface "Line" connection.

3. The interface recited in claim 2, wherein said loop circuit includes a first diode in series with said load resistor.

4. The interface recited in claim 3, wherein:

said input of said comparing circuit is at a fourth node of said loop circuit; and said load resistor and said first diode are coupled between said fourth node and said second node.

5. The interface recited in claim 3, wherein said loop circuit includes a second diode connected between said first node and said fourth node.

6. The interface recited in claim 1, wherein said switching circuit comprises:

a first relay having a first contact coupled to a first terminal of said telephone base output connection and a first terminal of said audio input connection and having a second contact coupled to said interface "Line" connection; and a second relay having a first contact coupled to a second terminal of said audio input connection and having a second contact coupled to a second terminal of said telephone base output connection and said interface "Line" connection.

7. The interface recited in claim 6, further comprising a third relay having a first contact coupled to a first terminal of said telephone base input connection and said interface "Line" connection and a second contact coupled to a first terminal of said audio output connection.

8. The interface recited in claim 1, further comprising:

a compensating resistor coupled between said interface "Line" connection and said telephone base output; and a compensating switch coupled to said compensating resistor for reducing impedance between said interface "Line" connection and said telephone base output when said signals received at said interface "Line" connection indicate an on-hook state.

9. The interface recited in claim 8, wherein:

said compensating switch is a transistor; and said transistor shorts said compensating resistor when said signals received at said interface "Line" connection indicate an on-hook state.

10. An interface for connecting an AVD modem having an AVD modem "Phone" connection and an AVD modem "Line" connection to a telephone instrument, the AVD modem having modulation/demodulation circuitry and having relay means for connecting the AVD modem "Phone" connection to the AVD modem "Line" connection when the modulation/demodulation circuitry is in an on-hook state and for connecting the modulation/demodulation circuitry to the AVD modem "Line" connection when the modulation/demodulation circuitry is in an off-hook state, the interface comprising:

a telephone base input connection for receiving signals from said telephone instrument;

a telephone base output connection for providing signals to said telephone instrument;

an audio input connection for receiving signals from a microphone;

an audio output connection for providing signals to a speaker;

an interface "Phone" connection connectable to said AVD modem "Phone" connection;

an interface "Line" connection connectable to said AVD modem "Line" connection;

a two-to-four-wire converter circuit between said AVD modem "Line" connection and said telephone base input and output connections;

a loop circuit having a first node at a terminal of said interface "Phone" connection, a second node at another terminal of said interface "Phone" connection, a third node coupled to a terminal of said interface "Line" connection, a fourth node and a load resistor coupled between said fourth node and said second node;

a comparing circuit having an input at said fourth node for providing a switching signal having a first state when a voltage at said fourth node exceeds a predetermined threshold and a second state when said voltage at said fourth node does not exceed said predetermined threshold, said voltage at said fourth node changing in response to connection of an impedance between two terminals of said interface "Line" connection;

a first relay having a first contact coupled to a first terminal of said telephone base output connection and coupled to a first terminal of said audio input connection and having a second contact coupled via said two-to-four-wire converter to said interface "Line" connection, said first and second contacts opening when said switching signal is in said first state and closing when said switching signal is in said second state; and a second relay having a first contact coupled to a second terminal of said audio input connection and having a second contact coupled to a second terminal of said telephone base output connection and coupled via said two-to-four-wire converter to said interface "Line" connection, said first and second contacts closing when said switching signal is in said first state and opening when said switching signal is in said second state.

11. The interface recited in claim 10, further comprising:

a compensating resistor coupled between said interface "Line" connection and said telephone base output; and a compensating switch coupled to said compensating resistor for reducing impedance between said interface "Line" connection and said telephone base output when said signals received at said interface "Line" connection indicate an on-hook state.

12. The interface recited in claim 11, wherein:

said compensating switch is a transistor; and said transistor shorts said compensating resistor when said signals received at said interface "Line" connection indicate an on-hook state.

13. A method for interfacing an AVD modem having an AVD modem "Phone" connection and an AVD modem "Line" connection to a telephone instrument using an interface device, the telephone instrument having a base with a handset input connection and a handset output connection, the AVD modem having modulation/demodulation circuitry and having relay means for connecting the AVD modem "Phone" connection to the AVD modem "Line" connection when the modulation/demodulation circuitry is in an on-hook state and for connecting the modulation/demodulation circuitry to the AVD modem "Line" connection when the modulation/demodulation circuitry is in an off-hook state, the method comprising the steps of:

providing an interface device having an interface "Phone" connection, an interface "Line" connection, an audio input connection, an audio output connection, a telephone base input connection and a telephone base output connection;

connecting said interface "Phone" connection to said AVD modem "Phone" connection;

connecting said interface "Line" connection to said AVD modem "Line" connection;

connecting a microphone to said audio input connection;

connecting a speaker to said audio output connection;

connecting said telephone base output connection to an input portion of a handset jack of said telephone instrument;

connecting said telephone base input connection to an output portion of a handset jack of said telephone instrument;

coupling a load resistor in said interface device to said AVD modem "Phone" connection to indicate an off-hook state;

detecting whether signals received at said interface "Line" connection indicate an off-hook state or an on-hook state;

coupling said microphone to said handset output connection of said telephone instrument when said signals received at said interface "Line" connection indicate an on-hook state;

coupling said handset input connection of said telephone instrument to said speaker when said signals received at said interface "Line" connection indicate an on-hook state;

coupling said interface "Line" connection to said telephone base connection when said signals received at said interface "Line" connection indicate an off-hook state; and coupling said audio input and output connections to said telephone base connection when said signals received at said interface "Line" connection indicate an off-hook state.

14. The method recited in claim 13, further comprising the step of reducing an impedance between said telephone base input connection and said interface "Line" connection when said signals received at said interface "Line" connection indicate an on-hook state.

* * * * *